United States Patent [19]
Child

[11] 3,958,809
[45] May 25, 1976

[54] TURNING

[76] Inventor: Roy Edward Child, The Old Hyde, Little Yeldham, Essex, England

[22] Filed: Dec. 10, 1973

[21] Appl. No.: 423,256

[30] Foreign Application Priority Data
- Dec. 13, 1973 United Kingdom............... 57403/72
- Jan. 25, 1973 United Kingdom................. 3754/73

[52] U.S. Cl................................................. 279/1 L
[51] Int. Cl.² .......................................... B23B 5/08
[58] Field of Search..................... 279/1 R, 1 F, 1 L

[56] References Cited
UNITED STATES PATENTS
2,070,898  2/1937  Hall et al............................. 279/1 L FOREIGN PATENTS OR APPLICATIONS
201,983  9/1908  Germany............................ 279/1 L
1,477,792  1/1970  Germany............................ 279/1 L Primary Examiner—Othell M. Simpson
Assistant Examiner—Leon Gilden
Attorney, Agent, or Firm—Baldwin, Wight & Brown

[57] ABSTRACT

Lathe chuck consisting of a main body onto which is screwed a clamping member having an aperture through which the end of a member to be turned may be passed. Introduced into the chuck to form a ring around the axis of rotation is a non-continuous length of coil spring which is deformed as the clamping member is screwed up onto the main body to reduce its length and thus the diameter of the ring it forms. Said end of the member to be turned is normally flanged and the reduced diameter of the ring formed by the coil spring inhibits withdrawal from the chuck.

14 Claims, 6 Drawing Figures

TURNING

This invention relates to turning and in particular to lathe chucks suitable for use with, and methods of turning, materials of limited shear strength in the direction of rotation. Materials of limited shear strength in the direction of rotation include, for example, wood, where the member to be turned is required to be mounted in the lathe with the grain running parallel to the axis of the lathe, and many plastics material.

Where such materials are required to be end turned, that is to say, where a tailstock cannot be used, fixing the member to be turned in the lathe by means of a face plate to which the member is attached by screws or the like, is often unsatisfactory, because during turning the fixing screws tend to shear the material of the member. Prior attempts to overcome this difficulty have included providing forms of colletless chucks, but so far as the applicant is aware these have imposed severe limitations on the cross sectional dimensions of the member to be turned.

The present invention seeks to provide improved lathe chuck arrangements and methods of turning in which the above mentioned difficulty is reduced, whilst avoiding very severe limitations on the cross sectional dimensions of a member to be turned.

The expression "lathe" as used herein includes machines such as drills capable of providing suitable rotational drive.

According to one aspect of this invention a lathe chuck arrangement comprises a main body provided to be engaged by the driving member of a lathe, a clamping member associated with said main body and having an aperture having an axis of rotation common with that of said main body and a resilient member introducable between co-operating surfaces of said main body and said clamping member to be deformed as said co-operating surfaces are caused to approach one another so as to provide a reduced diameter inhibiting removal of a member to be turned introduced in operation through said aperture in said clamping member.

According to another aspect of this invention a lathe chuck arrangement comprises a main body provided to be engaged by the driving member of a lathe, a clamping member carried by said body and having a surface facing an outer surface of said body and surrounding an aperture in said clamping member which aperture has an axis of rotation common with the rotational axis of said main body and which aperture is such that a flanged end of a member to be turned may pass therethrough, means for causing said surface of said clamping member and said outer surface of said main body to approach one another to effect a clamping action and a resilient member, introducable in the form of a ring between said surface of said clamping member and that surface of the flange of the member to be turned (when in operation passed through said aperture), which is remote from said outer surface of said main body and such that when said surface of said clamping member and said surface of said main body are caused to approach one another, said resilient member is deformed so as to reduce the inner diameter of the ring it forms around the axis of rotation and cause it to be loacted between said surface of said clamping member and said surface of said flange, to inhibit withdrawal of the latter through said aperture.

The nature of the flange provided on the member to be turned may take a number of different forms provided that towards the end of the member to be turned adjacent the chuck as it is offered up thereto there is exhibited a region of increased diameter with which said resilient member may key to inhibit withdrawal of said member from said chuck.

Clamping of the member to be turned may be completed by arranging for the flanged end thereof to abut the outer surface of said main body, but this is not essential. For example clamping may be completed by arranging for part of the body of the member to be turned, inwardly of the flanged end, to abut an outer surface of said clamping member, or, for example, by providing said flanged end of the member to be turned to exhibit a circumferential groove both sides of which are engaged by said resilient member as its diameter is reduced.

Preferably said clamping member is generally ring like in form with an internal thread mating with an external thread on said main body, whereby said surface of said clamping member and said outer surface of said main body may be caused to approach one another by screwing said clamping member on to said main body.

In one embodiment of the invention said surface of said clamping member is a tapered inner surface of a flange on said clamping member.

In another embodiment of the invention said surface of said clamping member is a step provided on the inner surface of a flange on said clamping member.

Preferably a recess is provided in said clamping member to accommodate said resilient member when, in operation, a flange member to be turned is passed through said aperture.

Preferably again said resilient member is a length of spring coil, preferably non-continuous, which is formed into a ring when positioned in the chuck.

If desired adaptive inserts may be provided, effectively reducing the size of said aperture in order to accommodate different dimensions of flanges on members to be turned.

Preferably again said main body is, as is usual practice, arranged to be fitted to the head stock of a lathe by means of a centrally disposed threaded hole in which case preferably said threaded hole extends through the axial length of said main body whereby, if desired, a member of suitable material to be turned may be provided with a stub and forcibly screwed directly into said threaded hole.

Again where said main body is arranged to be fitted to the head stock of a lathe by means of a centrally disposed threaded hole, a threaded adaptive insert may be provided to convert the chuck into one having a projection which may be gripped by the jaws of another chuck.

Preferably again the outer face of said main body is substantially planar and is provided with radially disposed fixing holes whereby the main body alone my be used as a form of face plate.

In a method of turning in accordance with the present invention utilising a chuck arrangement as described above, a member to be turned is first provided with a flanged end of maximum cross sectional dimension approximately corresponding to the cross sectional dimensions of said aperture, said flanged end is pased through said aperture, said resilient member is introduced between said surface of said clamping member and that surface of the flange on the member to be turned which is remote from said main body, and the outer surface of said main body and said surface of said clamping member are caused to approach one another to deform said resilient member so as to reduce the inner diameter of the ring it forms around the axis of rotation and cause it to be located between said surface of said clamping member and said surface of said flange to inhibit withdrawal of the latter through said aperture.

In a preferred method of turning in accordance with the present invention utilising a chuck arrangement as described above having a recess to accommodate said resilient member, said resilient member is introduced into said recess in said clamping member, said clamping member with said resilient member in said recess is passed over a flange provided on a member to be turned, said resilient member is displaced from said recess prior to offering up said clamping member and said member to be turned to said main body.

In a method of turning utilising a chuck arrangement as described above, in which said inner surface of said clamping member is tapered, preferably said surface of said flange provided on the member to be turned in at least approximately perpendicular to the axis of rotation.

In a method of turning in accordance with the present invention utilising a chuck arrangement as described above in which the inner surface of said clamping member is a step, preferably said surface of said flange on the member to be turned is itself tapered.

According to a modification, the outet surface of said main body is recessed to accommodate the flange of the member to be turned, preferably to a depth approximately equal to the length of the region of increased diameter provided by the flanging of the member to be turned where this flanging exhibits an inner wall extending at least approximately perpendicularly to the axis of said member to be turned.

The invention is illustrated in and further described with reference to the accompanying drawings in which.

In the drawings like references denote like parts.

Figure 1:
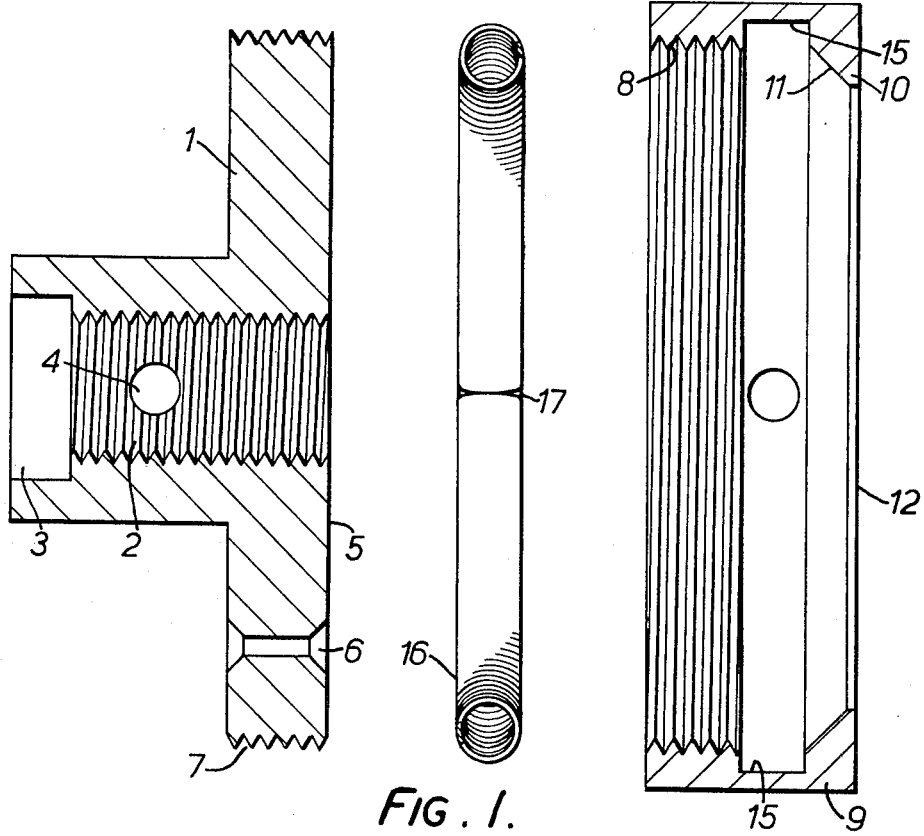
FIG. 1 is an exploded cross sectional view of one lathe chuck in accordance with the present invention.

Referring to FIG. 1, the main body 1 of the chuck arrangement consists of a flanged spindle having a centrally disposed threaded hole 2 extending through the axial length of the main body 1. Threaded hole 2 is provided to mate with the threaded spindle of the head stock of a lathe. Recess 3 is provided in known fashion to assist in registering the main body 1 with the lathe spindle. A hole 4 is provided to co-operate with a tommy bar to assist in the removal of the main body 1 from the lathe spindle. The outer face 5 of the main body 1 is planar and is provided with three radially disposed holes (of which only one, reference 6, is shown), so that the main body 1 may itself be used as a face plate.

The main body 1 is provided with an external thread 7, which mates with an internal thread 8 provided on a clamping member 9, which is generally ring like in form. Thus the clamping member 9 may be screwed on to the main body 1. the clamping member 9 is provided with a flange 10 presenting a surface 11 facing the surface of outer face 5. In this embodiment the surface 11 is tapered. The surface 11 surrounds an aperture 12 in clamping member 9 through which a flange 13 of a member 14 to be turned (see FIG. 2) may pass. The clamping member 9 has a recess 15, which will accommodate a non-continuous length of coil spring 16, introduced into the recess to form a ring prior to passing the flange 13 through the aperture 12. Abutting free ends of the length of coil spring 16 are represented at 17 in FIG. 1.

Figure 2:
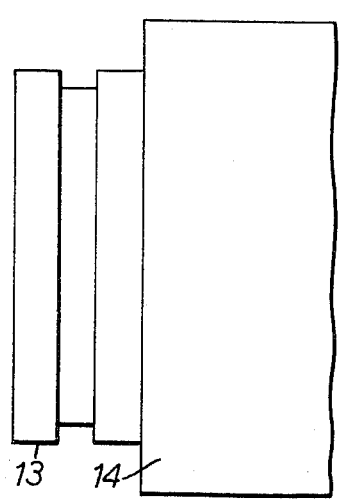
FIG. 2 illustrates a prepared member to be turned utilising the chuck arrangement of FIG. 1.
Figure 4:
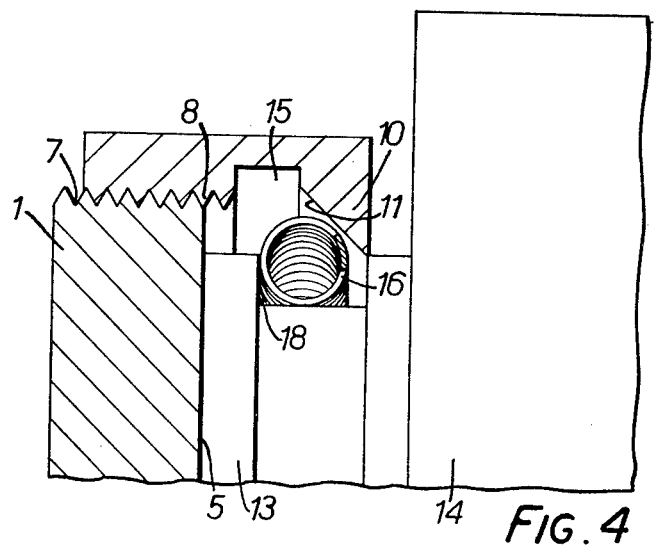
FIG. 4 illustrates the member of FIG. 2 in position in the chuck arrangement of FIG. 1

A method of utilising the chuck arrangement of FIG. 1 is best illustrated with reference to FIG. 4. Referring to FIG. 4, the member 14 to be turned is first provided with a flange 13 having an inner wall perpendicular to the axis of the member 14, by conventional turning between centres, as shown in FIG. 2. Resilient member 16 is introduced into recess 15 and the clamping member 9, prior to engagment with main body 1, passed over the flange 13. The resilient member 16 is then displaced from the recess 15, by means of a screwdriver or other suitable implement and worked into a position behind the flange 13. The clamping member 9 is then screwed on to the main body 5, so as to provide the assembly as illustrated in FIG. 4. Clamping member 9 is then screwed up on main body 5, so that the tapered inner surface 11 approaches the surface of outer face 5 against which the flange 13 is abutting. The spring 16 is deformed by this action and its length, and thus the diameter of the ring it forms around the axis of rotation, reduces so that the spring is now located between the surface 11 and the surface 18 of the flange 13 which is remote from the main body 5, securely locating the flange within the chuck arrangement. The member 14 may then be end turned as required. If for any reason member 14 is removed from the chuck arrangement a self-centring action will be observed upon replacement.

Figure 3:
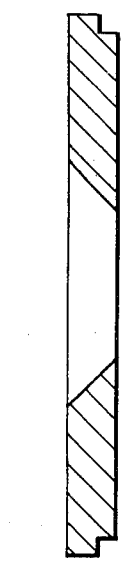
FIG. 3 illustrates an adaptor insert which may be used with the chuck arrangement of FIG. 1.

Referring to FIG. 3, this illustrates an insert which may be used in the chuck to reduce the diameter of the aperture 12 in order to accommodate the turning of members which are too small to provide a flange which will co-operate with the chuck arrangement shown in FIG. 1.

Figure 5:
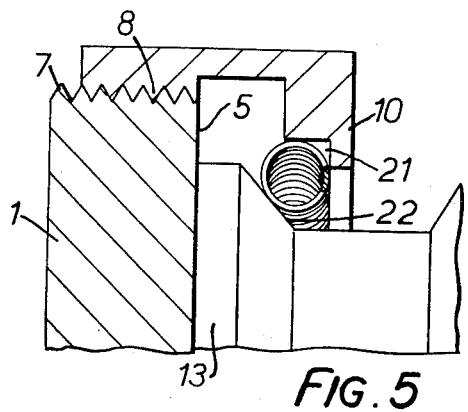
FIG. 5 illustrates a modification.

Referring to FIG. 5, the arrangement illustrated thereby is essentially similar to that shown in FIG. 1 except that the surface 11 of FIG. 1 is provided not as a taper, but as a step 1. When this embodiment of chuck arrangement is used, the surface 22 of the flange 13 should be tapered as shown. This arrangement may be found to provide a stronger grip on the body to be turned, but has the disadvantage that it is more difficult to assemble.

With the threaded hole 2 of the main body 1, as shown in FIG. 1, extending through the axial length of the main body 1, where convenient this may be used alone to grip a small body of suitable material, which has been provided with a stub and forcibly screwed into the free end of the hole 2.

Figure 6:
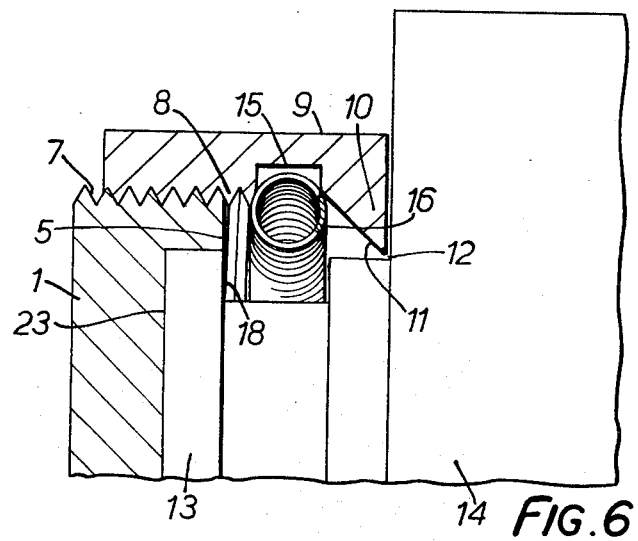
FIG. 6 illustrates a further modification.

Referring to FIG. 6, the chuck illustrated thereby is generally similar to that illustrated by FIG. 4. The difference between the two illustrated arrangements may be seen to be the provision in the case of FIG. 6 of a recession 23 in the outer surface 5 of main body 1. The depth of the recession 23 is approximately equal to the length of the region of increased diameter provided by the flange 13, which enters therein.

With this arrangement assembly with the resilient member 16 in the recess 15 of clamping member 9 and the clamping member 9 partially screwed onto main body 1, before the flange 13 is passed through the aperture 12 in clamping member 9, is facilitated. The clamping member 9 is then screwed up on the main body.

To remove the member to be turned, the clamping member 9 is partially unscrewed until the member to be turned can be pulled out through the aperture 12.

With the chucks previously described with reference to FIG. 1, 4 and 5 the clamping member 9 would normally be removed completely from main body 1 during assembly of a member to be turned in the chuck, or removal thereof, whereas with the arrangement of FIG. 6 these operations may relatively easily be accomplished without removing the resilient member 16 from clamping member 9, or clamping member 9 from the main body 1.

I claim:

1. A lathe chuck arrangement comprising a main body having an axis of rotation, mounting means on said main body for mounting said main body for rotation by a lathe driving member, said main body having an end surface for opposing an end of a workpiece to be turned, a clamping member, cooperating means on said main body and said clamping member for axially positioning said clamping member relative to said main body, said clamping member having therein a workpiece receiving aperture disposed concentric to said axis of rotation and axially spaced from said surface, and a resilient member disposed entirely within said clamping member, said aperture being at least in part defined by a seating surface for said resilient member, said seating surface facing generally radially inwardly towards said main body for applying a combined radial and axial force on a workpiece portion passed through said aperture in response to axial movement of said clamping member towards said main body, said clamping member having a storage area formed therein for said resilient member for storing said resilient member during engagement of a workpiece with said chuck, said storage area extending radially outwardly beyond said seating surface to an extent for allowing said resilient member to outwardly expand therein sufficiently for a workpiece to freely pass through said resilient member.

2. A lathe chuck arrangement in accordance with claim 1 wherein said clamping member includes a flange defining an end wall, and said aperture and said seating surface are formed in said end wall.

3. An arrangement as claimed in claim 2 and wherein said seating surface of said clamping member is a step provided on the inner surface of said flange on said clamping member.

4. A lathe chuck arrangement in accordance with claim 2 wherein said flange in part defines said storage area.

5. An arrangement as claimed in claim 1 wherein said clamping member is generally ring like in form and said cooperating means includes an internal thread on said clamping member mating with an external thread on said main body, whereby said surface of said clamping member and said outer surface of said main body may be caused to approach one another by screwing said clamping member on to said main body.

6. An arrangement as claimed in claim 1 and wherein said resilient member is a length of spring coil which is formed into a ring when positioned in the chuck.

7. An arrangement as claimed in claim 6 and wherein said spring coil is non-continuous.

8. An arrangement as claimed in claim 1 wherein said main body is arranged to be fitted to the head stock of a lathe, and said mounting means is in the form of a centrally disposed threaded hole.

9. An arrangement as claimed in claim 8 and wherein said threaded hole extends through the axial length of said main body whereby, if desired, a member of suitable material to be turned may be provided with a stub and forcibly screwed directly into said threaded hole.

10. An arrangement as claimed in claim 1 and wherein the outer face of said main body is substantially planar and is provided with radially disposed fixing holes whereby the main body alone may be used as a form of face plate.

11. An arrangement as claimed in claim 1 wherein the end surface of said main body is recessed to accommodate a flange of the workpiece to be turned.

12. A lathe chuck arrangement in accordance with claim 1 in combination with a workpiece having a flange at one end thereof, and said flange is clamped against said main body end surface by said resilient member in conjunction with said seating surface.

13. An arrangement as claimed in claim 1 and wherein said seating surface of said clamping member is a tapered inner surface of a flange on said clamping member.

14. A lathe chuck arrangement comprising a main body provided to be engaged by the driving member of a lathe, a clamping member carried by said body and having a seating surface generally facing an end surface of said body and surrounding an aperture in said clamping member which aperture has an axis of rotation common with the rotational axis of said main body and which aperture is such that a flanged end of a workpiece to be turned may pass therethrough, cooperating means on said main body and said clamping member for causing said surface of said clamping member and said end surface of said main body to approach one another to effect a clamping action, and a resilient member of an initial dimension to have passed therethrough the workpiece flanged end, a storage space formed in said clamping member for initially receiving said resilient ring, said storage space extending radially outwardly beyond said seating surface to an extent for allowing said resilient member to outwardly expand therein sufficiently for a workpiece flanged end to freely pass through said resilient member, said resilient member being in the form of a ring positionable between said seating surface of said clamping member and that surface of the flange of the workpiece to be turned which is remote from said end surface of said main body such that when said seating surface of said clamping member and said end surface of said main body are caused to approach one another, said resilient member is deformed so as to reduce the inner diameter of said ring it forms around the axis of rotation and cause said ring to be located between said seating surface of said clamping member and the workpiece flanged end to inhibit withdrawal of the workpiece through said aperture.

* * * * *